(12) United States Patent
Ivanovic (10) Patent No.: US 11,475,653 B2
(45) Date of Patent: Oct. 18, 2022

(54) PERCEPTUAL IMPORTANCE MAPS FOR IMAGE PROCESSING

(71) Applicant: ATI Technologies ULC, Markham (CA)

(72) Inventor: Boris Ivanovic, Markham (CA)

(73) Assignee: ATI Technologies ULC, Markham (CA)

( * ) Notice: Subject to any disclaimer, the term of this patent is extended or adjusted under 35 U.S.C. 154(b) by 2 days.

(21) Appl. No.: 15/965,640

(22) Filed: Apr. 27, 2018

(65) Prior Publication Data

US 2019/0332883 A1 Oct. 31, 2019

(51) Int. Cl.
| | | |
|---|---|---|
| *G06V 10/48* | (2022.01) | |
| *G06T 7/223* | (2017.01) | |
| *G06T 9/00* | (2006.01) | |
| *G06V 10/25* | (2022.01) | |
| *G06V 10/50* | (2022.01) | |

(52) U.S. Cl.
CPC .............. *G06V 10/48* (2022.01); *G06T 7/223* (2017.01); *G06T 9/00* (2013.01); *G06V 10/25* (2022.01); *G06V 10/50* (2022.01); *G06T 2207/20021* (2013.01); *G06T 2207/20024* (2013.01)

(58) Field of Classification Search
CPC .. G06K 9/4633; G06K 9/3233; G06K 9/4642; G06T 7/223; G06T 1/0007
USPC ......................................... 382/107, 225, 103
See application file for complete search history.

(56) References Cited

U.S. PATENT DOCUMENTS

| | | | |
|---|---|---|---|
| 8,687,702 B2 | 4/2014 | Schmit | |
| 2012/0044990 A1* | 2/2012 | Bivolarsky | .......... H04N 19/105 375/240.03 |
| 2016/0073111 A1* | 3/2016 | Lee | ...................... H04N 19/124 375/240.03 |
| 2016/0227218 A1* | 8/2016 | Trudeau | ............... H04N 19/129 |
| 2017/0070745 A1* | 3/2017 | Lee | ................... H04N 19/513 |
| 2018/0130220 A1* | 5/2018 | Goldentouch | .......... G06T 7/593 |
| 2018/0146208 A1* | 5/2018 | Hojati | .................... H04N 19/52 |

* cited by examiner

*Primary Examiner* — Kiet M Doan
(74) *Attorney, Agent, or Firm* — Volpe Koenig (57) ABSTRACT

The present disclosure is directed to techniques for determining a perceptual importance map. The perceptual importance map indicates the relative importance to the human visual system of different portions of an image. The techniques include obtaining cost values for the blocks of an image, where cost values are values used in determining motion vectors. For each block, a confidence value is derived from the cost values. The confidence value indicates the confidence with which the motion vector is believed to be correct. A perceptual importance value is determined based on the confidence value via one or more modifications to the confidence value to better reflect importance to the human visual system. The generated perceptual importance values can be used for various purposes such as allocating bits for encoding, identifying regions of interest, or selectively rendering portions of an image with greater or lesser detail based on relative perceptual importance.

23 Claims, 7 Drawing Sheets

PERCEPTUAL IMPORTANCE MAPS FOR IMAGE PROCESSING

BACKGROUND

Image processing is the process of analyzing an image to determine additional information pertinent to the image. A very wide variety of image processing techniques are known. Additional technical developments in the area of image processing are constantly being made.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for determining a perceptual importance map for an image or sequence of images. The perceptual importance map indicates the relative importance to the human visual system of different portions of an image. The techniques include obtaining cost values for the blocks of an image, where cost values are values used in determining motion vectors for, e.g., motion estimation in an image. Specifically, cost values are determined for a set of candidate motion vectors for a block of an image and the "best" cost determines the motion vector assigned to the block. For each block, a confidence value is derived from the cost values. The confidence value indicates the confidence with which the motion vector is believed to be correct. A perceptual importance value is determined based on the confidence value via one or more modifications to the confidence value. These modifications are intended to modify the confidence value to more accurately reflect importance to the human visual system. A map of perceptual importance values, that reflects the values for different blocks of an image, is generated and can be used for various purposes such as allocating bits to different blocks for encoding, identifying regions of interest of an image, or selectively rendering portions of an image with greater or lesser detail based on relative perceptual importance.

Figure 1:
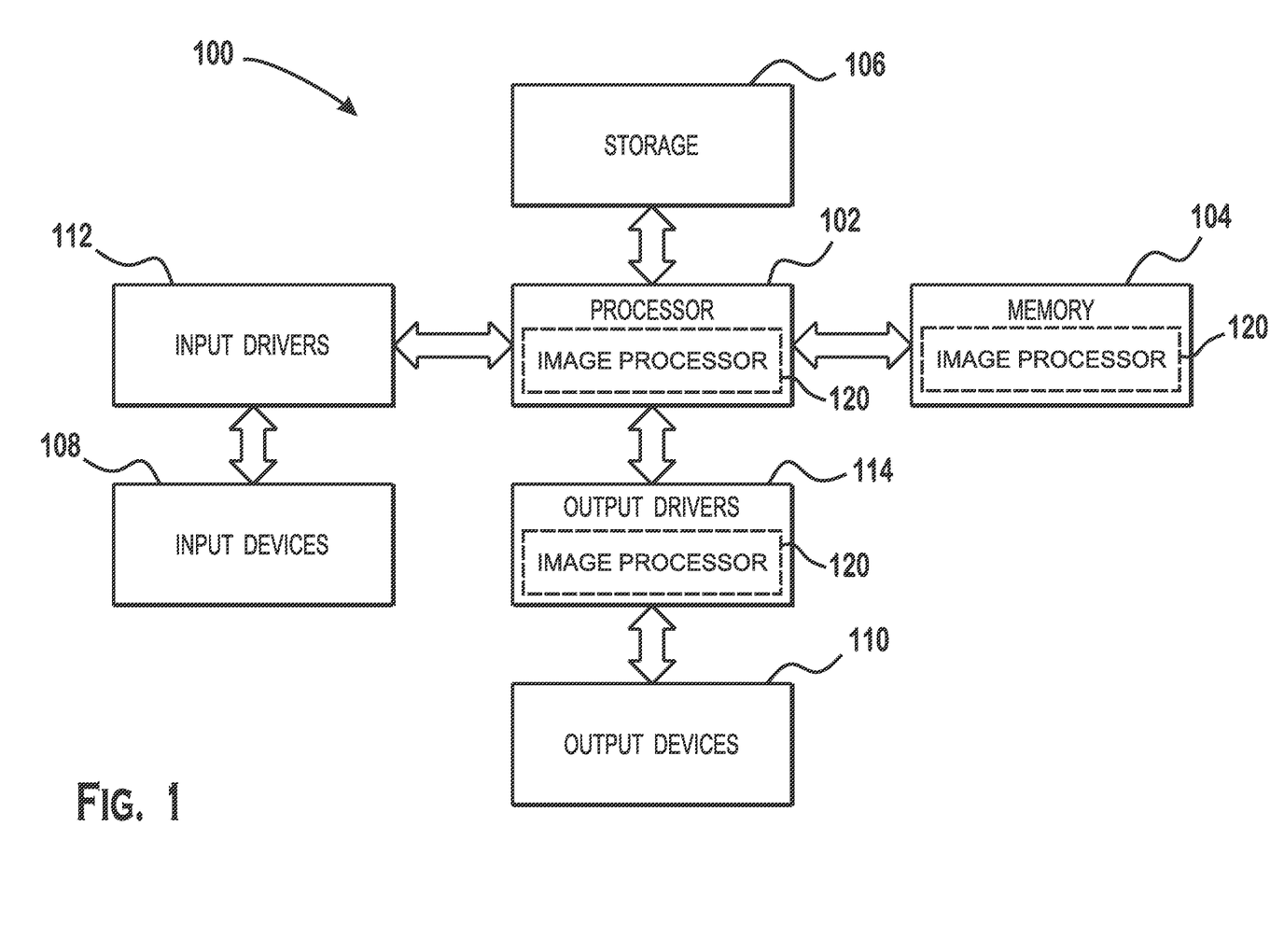
FIG. 1 is a block diagram of an example device in which aspects of the present disclosure are implemented.

FIG. 1 is a block diagram of an example device 100 in which aspects of the present disclosure are implemented. The device 100 includes, for example, a computer (such as a server, desktop, or laptop computer), a gaming device, a handheld device, a set-top box, a television, a mobile phone, or a tablet computer. The device 100 includes a processor 102, a memory 104, a storage device 106, one or more input devices 108, and one or more output devices 110. The device 100 optionally includes an input driver 112 and an output driver 114. It is understood that the device 100 optionally includes additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

An image processor 120 is shown in two different forms. The image processor 120 obtains images, processes the images, and outputs image processor output. In a first form, the image processor 120 is software that is stored in the memory 104 and that executes on the processor 102 as shown. In a second form, the image processor is at least a portion of a hardware graphics engine that resides in output drivers 114. In other forms, the image processor 120 is a combination of software and hardware elements, with the hardware residing, for example, in output drivers 114, and the software executed on, for example, the processor 102. The image processor 120 analyzes images stored in memory, such as in memory 104, or any other memory such as a buffer stored in or associated with a hardware implementation of the image processor 120, or any other memory. In various examples, the image processor 120 analyzes sequences of images output by a graphics processor (such as a three-dimensional graphics processing pipeline), or sequences of images stored, for example, as a movie in memory 104, storage 106, or some other location.

Figure 2:
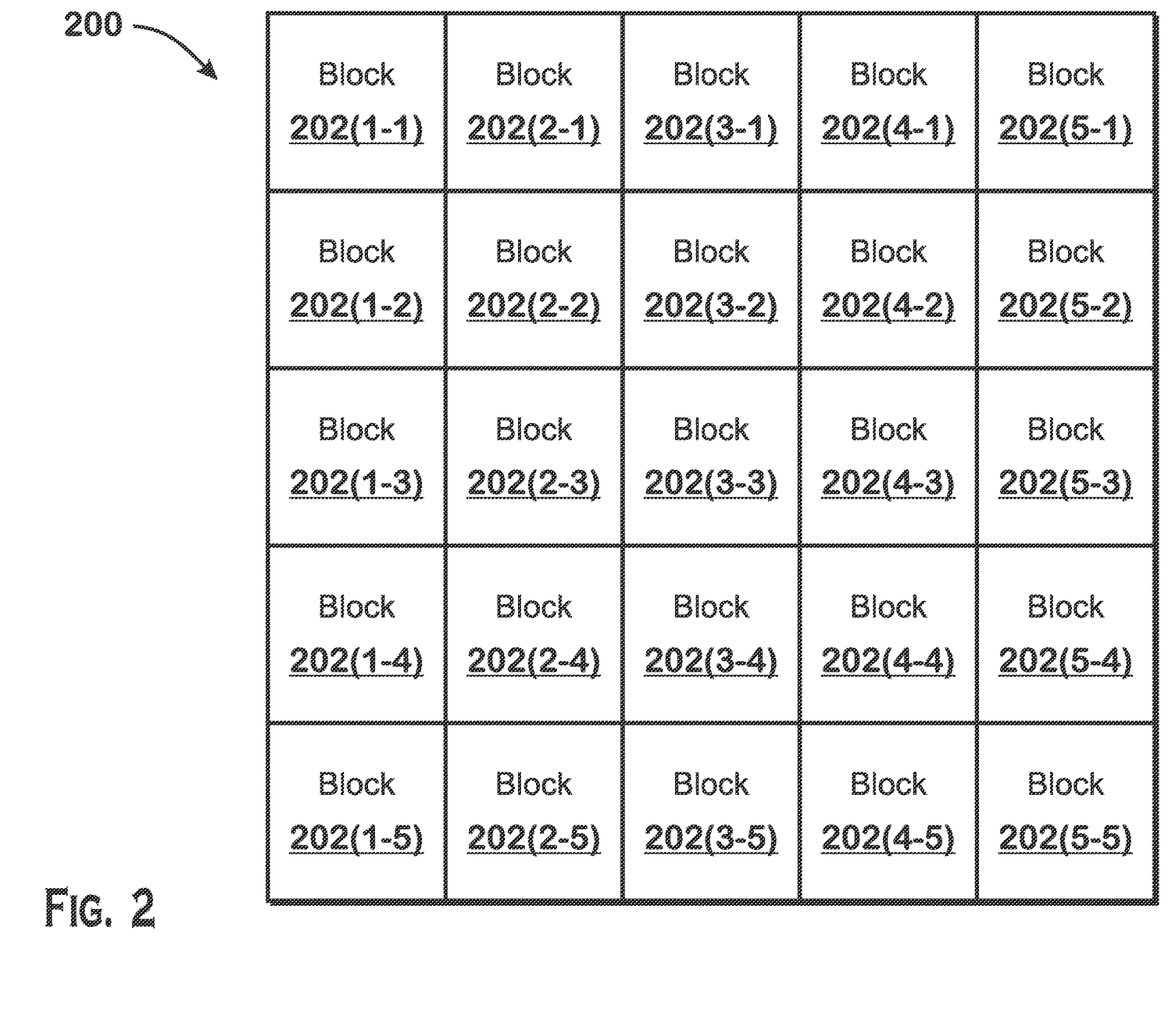
FIG. 2 illustrates an example image that includes a plurality of pixel blocks.

Motion vectors are analytical constructs used in many forms of image processing. Typically, an image processor, such as image processor 120, determines motion vectors for various blocks (groupings of pixels) of an image and uses the motion vectors for other processing. FIG. 2 illustrates an example image 200 that includes a plurality of pixel blocks 202. As illustrated, the pixel blocks 202 are subdivisions of the image 200. The image processor 120 may obtain motion vectors for any number of pixel blocks 202 of the image, but many image processing techniques obtain motion vectors for pixel blocks 202 that comprise the entire image.

The image processor 120 determines motion vectors for a particular pixel block 202 as follows. The image processor 120 identifies multiple candidate motion vectors and determines cost values for each candidate motion vector. Each candidate motion vector represents a displacement between the block under analysis and a block of a reference frame. The image processor 120 selects the motion vector for a block based on a comparison of the costs of the different motion vectors (in some techniques, this results in selection of the motion vector corresponding to the lowest cost). In many instances, the selected motion vector represents an estimated amount of motion between the block in the current frame and the block in the reference frame.

Figure 3:
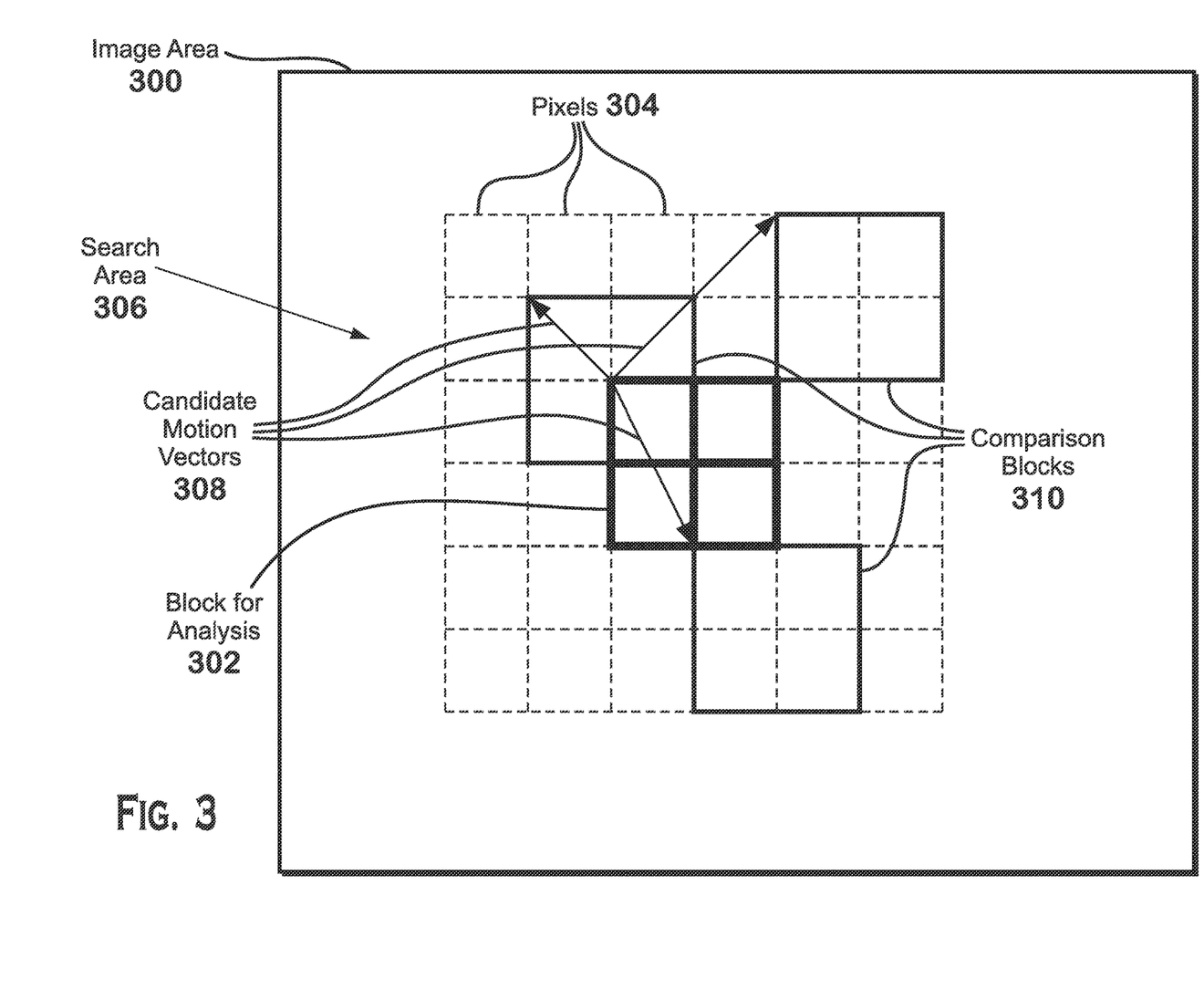
FIG. 3 illustrates an example instance of application of a technique to obtain motion vectors for a single pixel block for analysis.

FIG. 3 illustrates an example instance of application of a technique to obtain motion vectors for a single pixel block 302 for analysis. The pixel block 302 is within an image area 300 that represents both the area of the pixels of the current frame and the area of the pixels of the reference frame. Pixels of both the current frame and the reference frame are illustrated within the image area 300 so that the motion vector analysis can be illustrated. For the reference frame, only pixels within the search area 306 are illustrated. For the current frame, only pixels of the pixel block 302 are illustrated.

To determine the motion vector for the block for analysis 302, the image processor 120 determines costs for each of a variety of candidate motion vectors, which have a variety of directions and amplitudes, and then selects one of the costs based on a cost-selection criteria. The candidate motion vector associated with the selected cost is the motion vector for the block for analysis.

The set of candidate motion vectors that are analyzed may have any definable relationship to the block for analysis 302. In one example, the set includes motion vectors that point to each different pixel in the search area 306. Thus, the set of candidate motion vectors searched would point from one of the pixels of the block for analysis 302 to each of the pixels in the search area 306. In other examples, the set of candidate motion vectors points to a subset of pixels within a search area, with some pixels not pointed to.

The analysis that is performed to determine cost may be any technically feasible analysis, but generally involves a comparison of the pixels of the block for analysis 302 with the pixels of comparison blocks 310 defined by the candidate motion vectors 308. In an example, the cost analysis involves calculating some mathematical relationship between pixel pairs that include a pixel from the block for analysis 302 and a pixel from the comparison block 310. In other examples, single metrics are derived from the pixels in a block and those metrics are compared to corresponding single metrics of pixels of a block of a reference frame. Again, any other technically feasible technique is possible. The resultant cost values are analyzed and one is selected based on any technically feasible criteria to select the motion vector for the block for analysis 302. This technique is repeated for a variety (such as all) of blocks in the image to be analyzed. Regardless of which technique is used, the cost analysis compares pixels of the block for analysis 302, which is in a current frame, with pixels defined by the comparison blocks 310, which are part of a reference frame. Note, it is possible for a comparison block 310 to partially or fully overlap with the block for analysis 302, and even for a comparison block 310 to be in the exact same location as the block for analysis 302 (which would correspond to a motion vector of zero motion).

There are many techniques that can be used for determining cost of a block 202. One example is the sum of absolute differences technique. With the sum of absolute differences technique, cost is determined according to the following expression:

$$\sum_{i=0}^{n-1} \sum_{j=0}^{m-1} |C_{ij} - R_{ij}|$$

where n is the horizontal dimension of the block in pixels, m is the vertical dimension of the block in pixels, $C_{ij}$ is a pixel value (or sample) at location i, j in the block for analysis 302 and $R_{ij}$ is the corresponding pixel at location i, j in the comparison block 310. The $C_{ij}$ or $R_{ij}$ values can be brightness values if pixels are represented in the YUV color space or can be any of the red, green, or blue components, or a sum thereof, if the pixel is represented in the RGB color space.

Another example technique for determining cost is the mean squared error. With the mean squared error technique, cost is determined according to the following expression:

$$\frac{1}{N^2} \sum_{i=0}^{n-1} \sum_{j=0}^{n-1} (C_{ij} - R_{ij})^2$$

where, as with the mean absolute difference technique, $C_{ij}$ is a pixel at location i, j in the block for analysis 302 and $R_{ij}$ is the corresponding pixel at location i, j in the comparison block 310. Any other technically feasible technique for determining cost of a block 302 may alternatively be used.

Generally, the "final product" of this analysis is a motion vector for each block 302 of an image. In both of the above example techniques, a lower cost is associated with a "more desirable" motion vector. For example, in the sum of absolute differences technique, the cost value can be thought of as representing the total similarity between the block for analysis 302 and the comparison block 310. A lower sum of absolute differences represents a more similar block. Thus, the lowest cost would be associated with the most desirable motion vector, and the image processor 120 would select that motion vector for the block for analysis 302. It is possible, however, that cost values would be determined according to different techniques, in which a most desirable cost is the greatest cost or is determined in some other manner.

It is possible to derive other metrics from the above analysis. A "confidence metric" is useful for other aspects of image processing. This confidence metric conceptually represents the confidence that the determined motion vector is "correct" or otherwise the most desirable motion vector to use. Techniques are presented herein for determining the confidence metric, determining a perceptual importance metric based on the confidence metric, and using the perceptual importance metric for various purposes related to image processing.

Some example techniques for determining a confidence metric for a block 302 of an image are now described. In general, these techniques reflect the following facts. Blocks for analysis 302 that have distinctive traits will be similar to only one or a few blocks in the reference frame. Because similar blocks have a low cost while different blocks have a high cost, a block for analysis 302 that has distinctive visual traits will lead to only a few low costs with many high costs. This type of spread out distribution of costs would thus indicate a high confidence that the selected motion vector is correct. On the other hand, blocks for analysis 302 that do not have distinctive visual traits will be similar to more surrounding blocks, resulting in a less spread out distribution of costs. This less spread out distribution of costs would indicate a lower confidence that the selected motion vector is correct.

In one example technique, the image processor 120 determines the confidence metric as a ratio of the "best" cost to the "worst" cost (or the reciprocal thereof, if appropriate). Taking the sum of absolute differences technique as an example, the lowest cost would be the cost for the selected motion vector while the highest cost would represent the similarity of the block for analysis 302 to the least similar block. This ratio would be indicative of the degree to which the cost values are "spread out" for the block for analysis 302, which, as described above, would correlate to the distinctiveness of the block for analysis 302. More specifically, a higher such metric would indicate a higher confidence and a lower metric would indicate a lower confidence. Because the motion vector is more likely to be correct for a distinctive block, this ratio would be a good representation of the confidence metric.

In another example technique, the image processor 120 determines the confidence metric as the ratio of the second best cost to the worst cost. This technique could be used similarly to the best to worst cost technique. More specifically, a high value would indicate a more distinctive block and thus a higher confidence while a low value would indicate a less distinctive block and thus a lower confidence.

In yet another example technique, the image processor 120 determines the confidence metric as the ratio of the best cost to the second best cost. Again, a higher value would indicate a more distinctive block and thus a higher confidence while a lower value would indicate a less distinctive block and thus a lower confidence. In still another example technique, the image processor 120 determines the confidence metric as the ratio of the best cost to the average of all of the costs. Again, a higher value would indicate a more distinctive block and thus a higher confidence while a lower value would indicate a less distinctive block and thus a lower confidence.

The image processor 120 determines a perceptual importance metric based on the confidence metric. In various implementations, the image processor 120 implements one or more of a variety of techniques alone or in combination for determining the perceptual importance metric based on the confidence metric.

A variety of techniques that can be implemented by the image processor 120 to obtain the perceptual importance metric are now described. The techniques include applying any of the following sets of operations alone or in combination.

According to one set of operations for obtaining the perceptual importance metric, the image processor 120 reduces the range of costs that are considered for determining the confidence metric. More specifically, as described above, the image processor 120 may determine the costs for the purpose of determining a motion vector for a block. In doing so, the image processor determines costs within a certain area of the image (such as the search area 306). Instead of using each of those costs for obtaining the confidence metric, the image processor 120 instead uses costs for a more restricted search area. In other words, according to this set of operations, the image processor 120 determines the motion vector for a block using costs from a larger area of the image and determines the confidence value using costs from a relatively smaller area of the image. This restricted area means that costs used for the confidence value would not be derived from high amplitude motion vectors. This set of operations accounts for the fact that objects having a high degree of motion are less perceptible to the human visual system.

According to another set of operations for obtaining the perceptual importance metric, the image processor 120 applies one or more linear or non-linear transformations to the confidence metric to obtain the perceptual importance metric. In an example, the transformations applied include one or more of scaling or shifting (i.e., applying an offset to) the confidence metric, applying a piecewise transformation function to the confidence metric, or applying look-up tables to the confidence metric. In an example, the transformation includes adding an offset and clamping the values to a range. This transformation is a non-linear transform that seeks to treat all values above a maximum the same and/or below a minimum the same, and to give some distinctive significance to values between the range. In the context of confidence metrics, this transformation has the effect of treating values that should be treated conceptually the same, but that might vary greatly numerically, the same. In an example, confidence values of 0.1% and 10% represent very low confidence values, but vary by a factor of 100 numerically. Despite this numerical disparity, it may be desirable to treat these confidence values the same. Any of the transformations described may be applied alone or together, and other transformations not listed may be applied alternatively or additionally.

According to another set of operations for obtaining the perceptual importance metric, the image processor 120 applies one or both of spatial or temporal filters. Applying spatial filters includes applying some spatial filtering function to multiple confidence values in a single frame. The result is that confidence values in a filtering area are affected by other confidence values in that filtering area. In an example, spatially filtering a particular confidence value includes multiplying the confidence value by a weight and adding weighted versions of neighboring confidence values. Any type of spatial filtering may be applied. Applying temporal filtering includes applying some temporal filtering to multiple confidence values for the same block or nearby blocks over different frames. The result is that confidence values are affected by confidence values of other frames. In an example, temporally filtering a particular confidence value includes multiplying the confidence value by a weight and adding weighted versions of confidence values forwards or backwards in time (subsequent or previous frames). Temporal filtering provides smoothing to reduce the visual impact of abrupt changes in perceptual importance values across different frames. In some examples, the image processor 120 prevents temporal filtering from occurring across scene change boundaries (which can be detected, for example, via an infinite impulse response (IIR) filter).

According to yet another set of operations for obtaining the perceptual importance metric, the image processor 120 modifies the confidence value based on one or more terms that take amplitude of motion into account. Higher motion reduces perceptual importance of a block because the human visual system is less able to perceive detail in fast moving subjects than in slow moving or stationary subjects. For this reason, the set of operations includes modifying the confidence value for a block based on the motion vector determined for that block. In various examples, modifying the confidence value based on one or more terms that take amplitude of motion into account include dividing the confidence value by one or more of the following terms:

$|dx|+|dy|;$ $dx^2+dy^2;$ or $\sqrt{dx^2+dy^2}.$ where dx is the x component of the motion vector and dy is the y component of the motion vector determined for the block for which the perceptual importance metric is being determined. Although certain specific terms are shown, it should be understood that other terms not shown could be used alternatively or in conjunction with the terms provided.

Figure 4A:
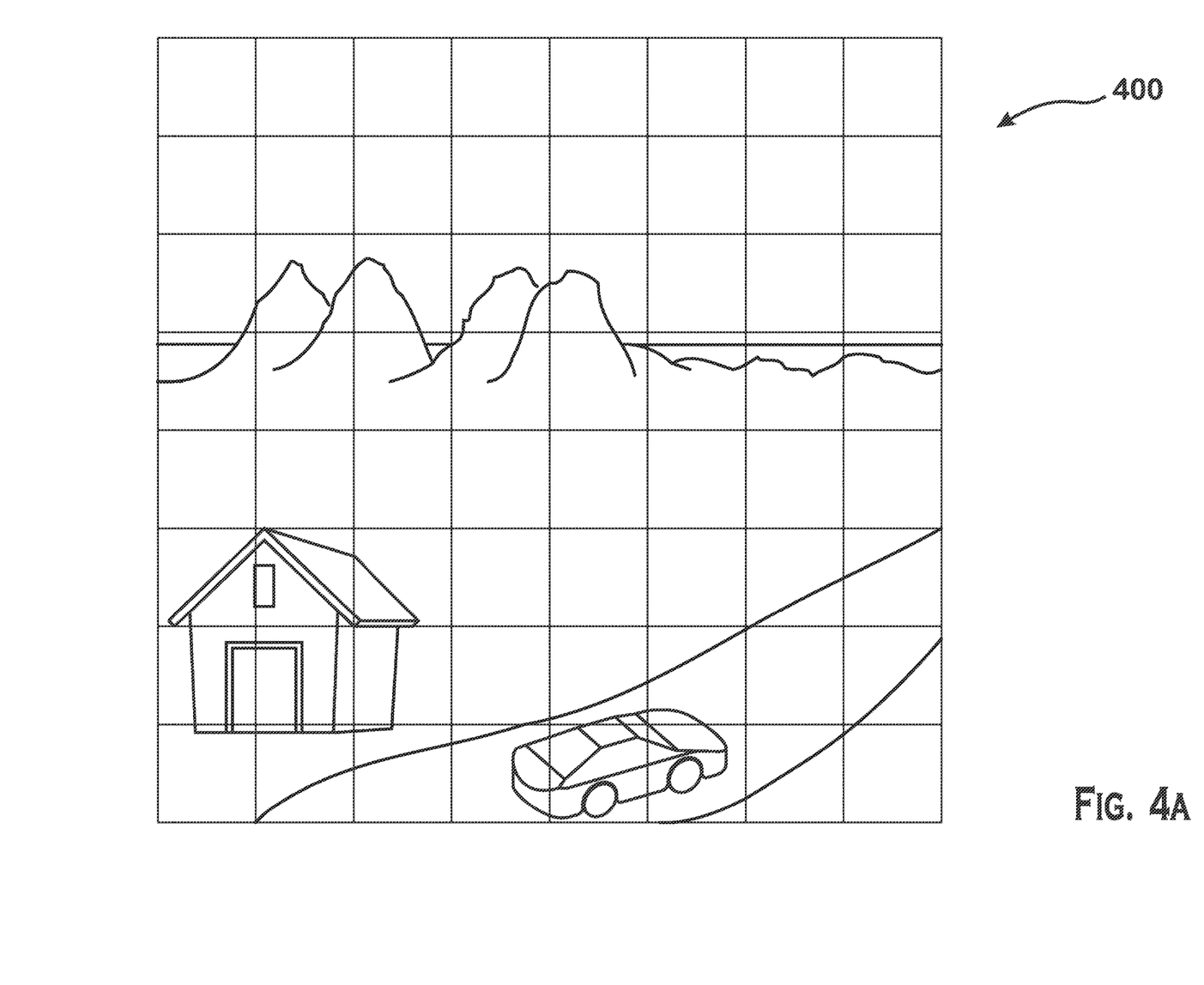
FIGS. 4A-4C depict example images that illustrate example techniques for determining perceptual importance values.
Figure 4B:
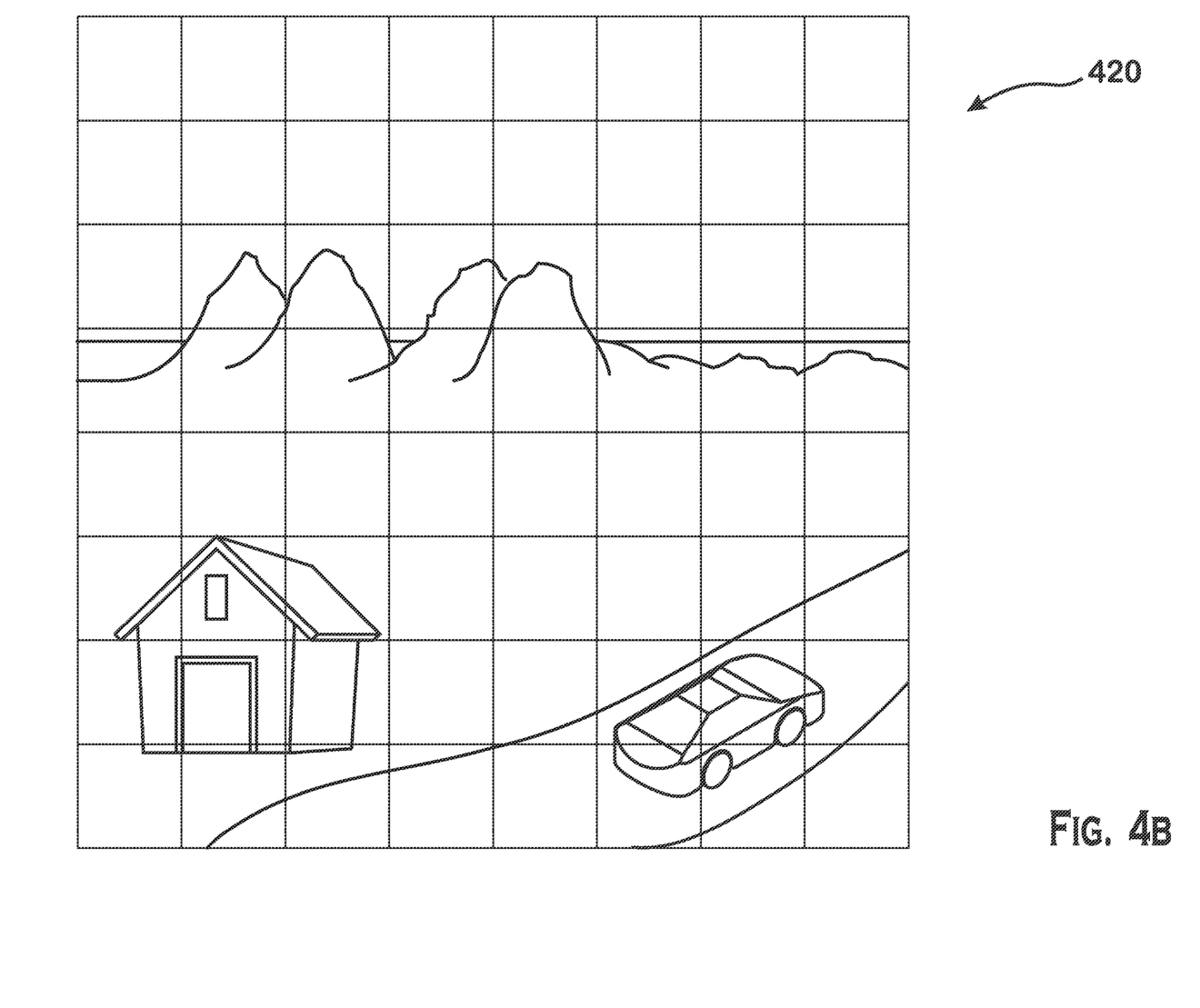
Figure 4C:
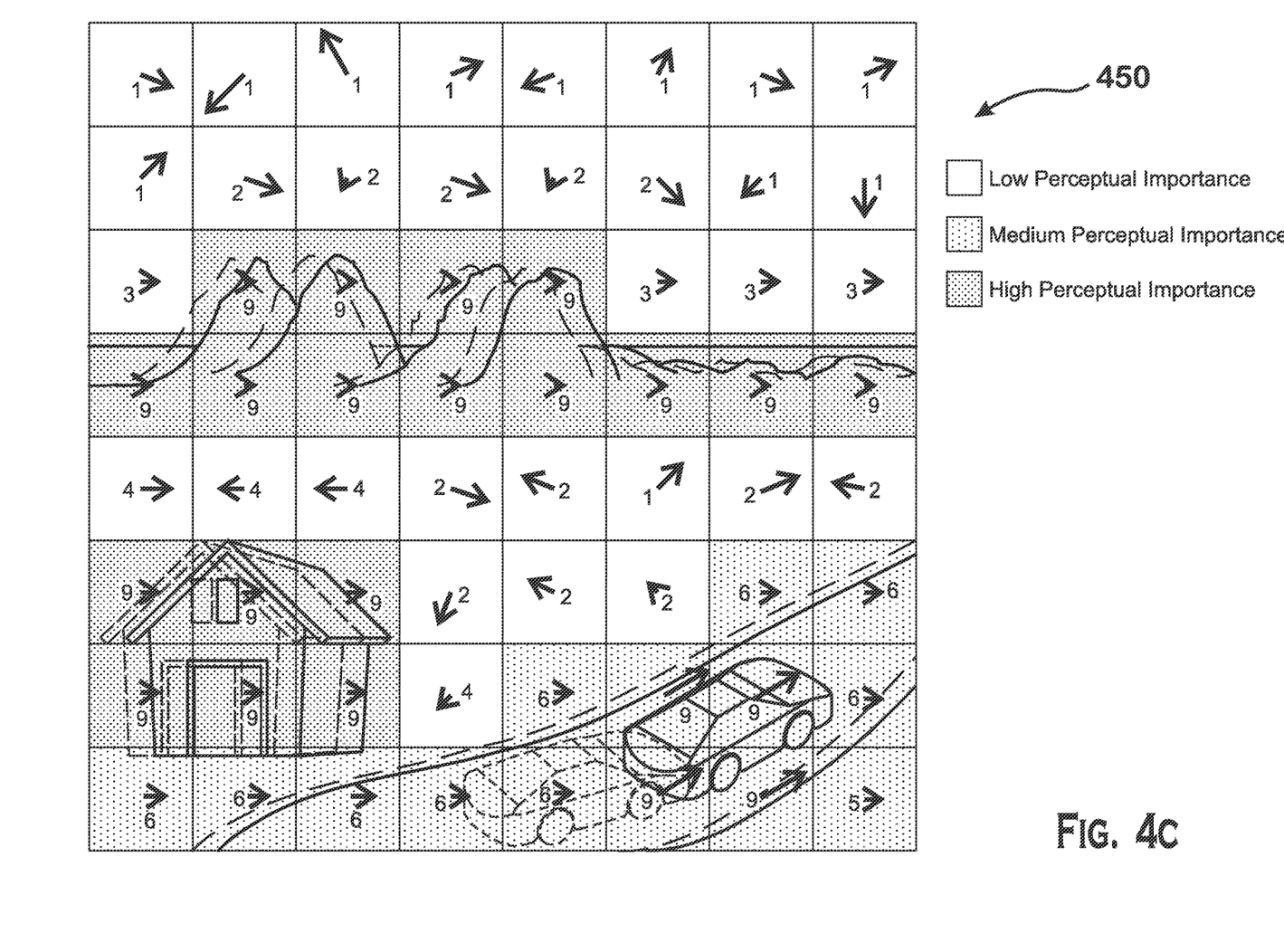

FIGS. 4A-4C illustrate an example sequence of images for which perceptual importance values are determined. In each of the images, a grid is shown. Each square of the grid represents a different block of pixels. FIG. 4A illustrates a first image 400 (referred to as the "previous" image because it is prior to the image of FIG. 4B) that includes horizon scenery, a barn, and a road with a vehicle on it. FIG. 4B illustrates a second image 420 (referred to as the "current image") that has similar content as the first image, except that the camera has panned to the left, and thus the scenery has shifted to the right. In addition, the car has traveled down the road.

FIG. 4C depicts an overlay 450 of the previous image 400 and the current image 420, and includes additional information related to the techniques for determining perceptual importance that are described herein. The previous image is illustrated with a dotted line and the current image is illustrated with a solid line. Aspects of the analysis described herein are illustrated.

Motion vectors (arrows originating at the center of each block) along with confidence values (numbers adjacent to the arrows) are illustrated for each block. As described elsewhere herein (e.g., with respect to FIG. 3), the motion vectors represent estimated motion from the previous image to the current image. The confidence values illustrate the confidence that the motion vectors are "correct," and are generated according to any of the techniques described herein. The confidence values range from 1 to 10 for simplicity of illustration, but it should be understood that confidence values could be within any other numerical range.

The top section (top two rows of blocks) represents the sky. Motion vectors are illustrated, but the associated confidence values are low because of the uniformity among the blocks in the sky. In other words, it is difficult to select a direction associated with the best match because the visual features are uniform.

The next section down (next two rows of blocks) includes the horizon line with mountain detail. This section of the image is relatively detailed and thus the confidence of the motion vectors is high. Each of the motion vectors for the blocks including mountain detail has approximately the same direction and magnitude, and the confidence value for each such motion vector is illustrated as being 9. Several blocks in these two rows have little to no visual detail and thus have a much lower confidence value. The next row, below the two rows including the mountains, has little to no detail. Thus, the motion vectors for the blocks in this row are semi-random and have relatively low confidence values.

The three bottom rows include detailed features including the barn, the car, and the road. Thus the motion vectors for these blocks reflect the panning of the camera and also have high confidence values. Some blocks, such as those only including small details of the roads, have medium confidence values (e.g., values of 6). The blocks in the current image including the car have a different motion vector, reflecting a combination of the pan and the motion of the car. This motion vector has a greater amplitude than the motion vectors for other blocks, representing only panning of the image. Also, due to the distinctive visual features of the car, the motion vectors for the blocks including the car have a high confidence value.

The image processor 120 generates perceptual importance values for the blocks shown based on the confidence values and the motion vectors. In the particular technique illustrated, the image processor 120 performs the following operations. First, the image processor 120 performs a transform on the confidence value to obtain an intermediate perceptual importance value. The transform is a lookup table transform that groups different ranges of confidence values into different perceptual importance groups. For confidence values from 1-4, the image processor 120 assigns an intermediate perceptual importance value of "1," for confidence values from 5-6, the image processor 120 assigns an intermediate perceptual importance value of "2," and for confidence values from 7-9, the image processor 120 assigns an intermediate perceptual importance value of "3." The image processor 120 weights these intermediate perceptual importance values based on the magnitude of the motion vector, decreasing the intermediate perceptual importance values as that magnitude increases (to account for the fact that the human visual system is less able to perceive detail on fast moving subjects than on slow moving or stationary subjects). This weighting is reflected in the blocks having the car, in the bottom right of the screen, which each has a confidence value of 9. The weighted confidence values are then sorted into bins: low, medium, and high perceptual importance values. The blocks with confidence values of 7-9 are assigned to the high perceptual importance value bin, except for the blocks having the car, which are assigned to the medium perceptual importance value bin, due to the motion-related weighting. The blocks having 5-6 confidence values are also assigned to the medium perceptual importance bin, and the blocks having 1-4 confidence values are assigned to the low perceptual importance bin. Although represented as conceptual values, the "high," "medium," and "low" perceptual importance values may be assigned numerical values, and these numerical values may be used in further operations. It should be understood that FIGS. 4A-4C represent merely an example technique for deriving perceptual importance values based on motion estimation operations and that any technique consistent with the present disclosure may be used.

Once a perceptual importance metric is determined, the image processor 120 performs one or more operations based on the perceptual importance metric. One such operation includes assigning compression factors to different blocks of the image based on the perceptual importance metric. According to this operation, given a particular bitrate budget, the image processor 120 assigns bits to different blocks based on relative perceptual importance. In an example, blocks having a higher perceptual importance would be assigned more bits and blocks having a lower perceptual importance would be assigned fewer bits. In an example, the image processor 120 normalizes perceptual importance values to assign bitrate for each block. This normalization allows bits to be assigned proportionally to the relative perceptual importance values, which would allow, for example, an image with all high importance blocks or all low importance blocks to have an even distribution of bits among blocks but for an image that has different perceptual importance values for different blocks to have different bits assigned to different blocks. In an example of normalization, the image processor 120 would sum all numerical perceptual importance values for all blocks to obtain a total perceptual importance value. For each block, the image processor 120 would divide the perceptual importance value for that block by the total perceptual importance value and multiply the total bit budget for the image by the resulting number. Any other technique for assigning bits of a bitrate budget to blocks based on perceptual importance could alternatively or additionally be used. After bits of the bitrate budge are assigned to the different blocks, the image processor 120 compresses the different blocks utilizing the assigned number of bits for the compression of each block. This technique allows blocks having a higher perceptual importance to be encoded with more bits and blocks having a lower perceptual importance to be encoded with fewer bits, effectively redistributing encoding bits from less "important" areas to more "important" areas of the image (where, again, "important" areas are those considered to be highly discernably by the human visual system, such as stationary blocks with high levels of detail).

In another example, the image processor 120 uses perceptual importance in combination with other metrics to identify regions of interest for other operations. Several examples are now provided. In one example, perceptual importance is enhanced with the addition of flesh tone detection. More specifically, instead of modifying the number of bits assigned to particular blocks of an image based on perceptual importance, perceptual importance is first modified by a flesh tone metric (for example, indicating how similar the color of a particular block is to a flesh tone) and then the modified value is used to determine the number of bits to assign to a particular block of an image. In another example, face detection is used in conjunction with the perceptual importance to determine the number of bits to use to compress particular blocks of an image. As with the flesh tone detection technique, with the face detection technique, the perceptual importance value is further modified based on how likely a particular block is to be at least part of a face. Blocks with higher likelihood of being a face would be assigned more bits than blocks with a lower likelihood of being a face. In yet another example, other metadata that indicates the importance of objects is used to further modify the perceptual importance values (for example, game metadata identifying important game objects, or other types of metadata are used).

In yet another example, the image processor 120 uses perceptual importance to assist with graphics rendering. In an example, perceptual importance helps identify areas for greater rendering detail and areas for lower rendering detail, which allows for rendering resources to be focused on more important areas of an image, thereby improving efficiency. Once a frame is rendered, the image processor 120 would perform the above processing to determine a perceptual importance map. This map could be used to encode the image for a cloud gaming scenario (i.e., the encoded image being transmitted to a player). In addition, the perceptual importance map could be used to create a "rendering resolution map" to adjust the resolution of different areas of the image (using similar techniques as, or combined with, e.g., foveated rendering or checkerboard rendering) such that higher perceptual importance areas are given higher resolution and lower perceptual importance images are given lower resolution. This rendering resolution map would be applied to the next frame, as long as the next frame belong to the same "scene." The rendering resolution map can be adjusted based on motion vectors so that the map accounts for the movement of visual features between frames. In other words, once the perceptual importance map is determined for a frame, the locations of the perceptual importance values are spatially shifted based on motion vectors for the frame to account for predicted motion between frames.

Figure 5:
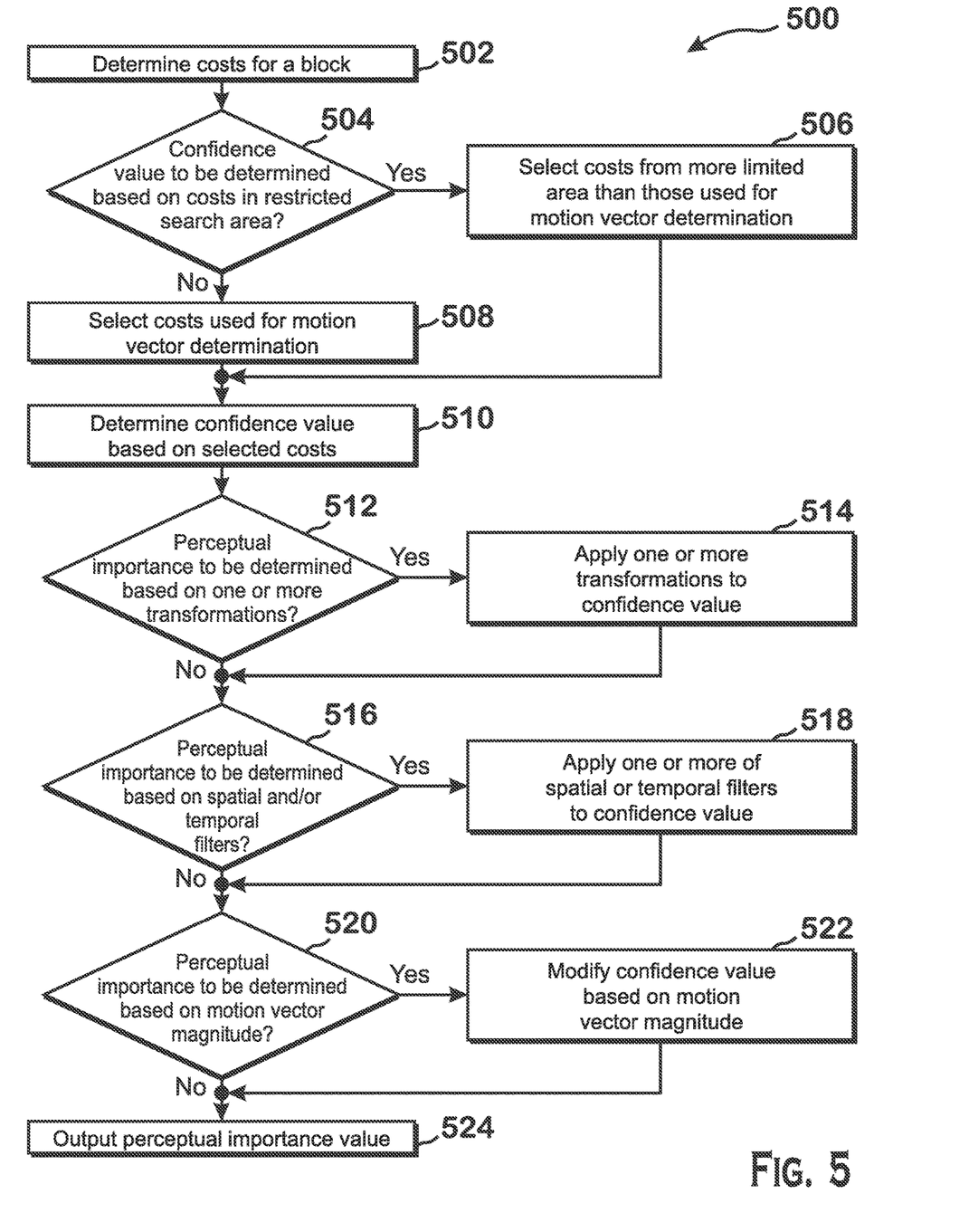
FIG. 5 is a flow diagram of a method for determining perceptual importance values for an image, according to an example.

FIG. 5 is a flow diagram of a method 500 for determining perceptual importance values for an image, according to an example. Although described with respect to the system shown and described with respect to FIGS. 1-3 and 4A-4C, it should be understood that any system configured to perform the method, in any technically feasible order, falls within the scope of the present disclosure.

The method 500 begins at step 502, where the image processor 120 determines costs for a block of an image. As described elsewhere herein, the image processor 120 determines the cost for a block by identifying a plurality of candidate motion vectors, determining associated costs for each of the candidate motion vectors, and identifying a cost for the block by selecting one of the associated costs based on a cost selection criteria. In an example, the image processor 120 calculates a cost corresponding to a motion vector by comparing pixels of the block to pixels of a reference frame in an area indicated by the motion vector. In an example, the lowest cost represents the best matched motion vector, so the image processor 120 selects the motion vector associated with the lowest cost as the motion vector for the block. The image processor 120 identifies that lowest cost as the cost determined for step 502.

As described above, the perceptual importance value may be determined based on a confidence that is determined based on all costs considered in determining the motion vector. Alternatively, the perceptual importance value may be determined based on a confidence that is determined based on a smaller set of costs than all those considered in determining the motion vector, such as a set including all costs for candidate motion vectors pointing to an area that is more restricted than the area covering the set of candidate motion vectors from which the cost is determined. Thus, at step 504, if the image processor 120 is to determine the confidence values based on costs in a restricted search area, then the method 500 proceeds to step 506 where the image processor 120 selects costs from a more limited area than those used for motion vector determination; then the method 500 proceeds to step 510. If at step 504, the image processor 120 is to determine the confidence values based on costs in the same search area as that used for the motion vector, the method proceeds to step 508. At step 508, the image processor 120 selects the costs used for motion vector determination as the costs for determining the confidence value.

At step 510, the image processor 120 determines the confidence value based on the selected costs. Any technically feasible technique for determining the confidence value could be used. Some examples, such as calculating ratios between different costs of candidate motion vectors as described elsewhere herein, could be used.

At step 512, if the perceptual importance value is to be determined based on one or more transformations, then the method 500 proceeds to step 514, and if the perceptual importance is not to be determined based on one or more transformations, then the method 500 proceeds to step 516. At step 514, the image processor 120 applies one or more transformations to the confidence value. Any technically feasible transformation may be applied, and some examples are described herein, for example with respect to FIG. 3.

At step 516, if the perceptual importance value is to be determined based on one or more of temporal or spatial filters, then the method 500 proceeds to step 518, where the image processor 120 applies one or more spatial and/or temporal filters to the confidence values, and if the perceptual importance value is not to be determined based on one or more of temporal or spatial filters, then the method 500 proceeds to step 520. Some example techniques for applying spatial and/or temporal filters are described elsewhere herein, for example, in the description associated with FIG. 3, and generally include modifying confidence values based on those of neighboring blocks (spatial) or on blocks at different frames (temporal) in order to reduce abrupt changes in perceptual importance between frames or within frames.

At step 520, if the perceptual importance value is to be determined based on motion vector magnitude, then the method 500 proceeds to step 522 and if the perceptual importance value is not to be determined based on motion vector magnitude, then the method 500 proceeds to step 524. At step 522, the image processor 120 modifies the confidence value based on motion vector magnitude, in order to give blocks with higher degrees of motion less perceptual importance than blocks with lower degrees of motion. Techniques described herein include modifying the confidence value by a term that includes aspects of the motion vector determined for the block for which perceptual importance is being determined, and are described with respect to FIG. 3.

The method 500 includes application of any combination of four sets of techniques (steps 506, 514, 518, and 522), and one, more than one, or none of those techniques may be used in converting the confidence value to a perceptual importance value. Steps 504, 512, 516, and 520 are illustrated as decision blocks. Any of these decisions, which determine what contributes to the perceptual importance values, may be made at runtime during decoding or may represent different hard-coded configurations for the technique. In other words, method 500 may represent a set of different possible combinations of techniques for converting from confidence value to perceptual importance value.

At step 524, the perceptual importance value is output. This perceptual importance value may be accumulated with other perceptual importance values into a perceptual importance map, which may be used for other purposes as described elsewhere herein, such as assigning bits of a bit budget to different blocks based on relative perceptual importance, determining region of interest of an image, or performing processing related to 3D rendering.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for obtaining a perceptual importance map for an image, the method comprising:
   determining cost metrics for a set of candidate motion vectors for a block of pixels of the image;
   performing motion prediction for the block based on one candidate motion vector of the set of candidate motion vectors, wherein the one candidate motion vector is selected based on the cost metrics;
   determining a confidence value for the block based on the cost metrics for the candidate motion vectors, based on a comparison of a first cost metric of the cost metrics to a second cost metric of the cost metrics;
   obtaining a perceptual importance metric for the block by modifying the confidence value based on perceptual importance of visual contents of the block; and
   compressing the image based on the perceptual importance metric.

2. The method of claim 1, wherein the modifying includes:
   restricting the cost metrics used for determining the confidence value to an area of the image that is smaller than an area from which cost metrics are used for determining a motion vector for the block of pixels.

3. The method of claim 1, wherein the modifying includes:
   modifying the confidence value based on a magnitude of a motion vector determined for the block of pixels of the image.

4. The method of claim 1, wherein the modifying includes:
   applying one or more of either or both of spatial or temporal filters to the confidence value and confidence values of either or both of neighboring blocks of pixels of the image or blocks of pixels of either or both of future and past frames.

5. The method of claim 1, wherein the modifying includes:
   applying one or more of linear or non-linear transformations to the confidence value.

6. The method of claim 1, wherein determining the cost metrics comprises:
   for each of the candidate motion vectors, determining a cost metric based on similarity between the block of pixels of the image and a block of pixels pointed to by a candidate motion vector of the candidate motion vectors.

7. The method of claim 1, further comprising:
   modifying a number of bits to use for compressing the block based on the perceptual importance metric.

8. The method of claim 1, further comprising:
   performing one of determining an area of interest of the image or adjusting an aspect of three-dimensional rendering of a subsequent frame based on the perceptual importance metric.

9. The method of claim 1, wherein the determining of the confidence value is based on a distribution of the determined cost metrics.

10. A system for obtaining a perceptual importance map for an image, the system comprising:
    a memory storing the image; and
    an image processor configured to:

determine cost metrics for a set of candidate motion vectors for a block of pixels of the image;

perform motion prediction for the block based on one candidate motion vector of the set of candidate motion vectors, wherein the one candidate motion vector is selected based on the cost metrics;

determine a confidence value for the block based on the cost metrics for the candidate motion vectors, based on a comparison of a first cost metric of the cost metrics to a second cost metric of the cost metrics;

obtain a perceptual importance metric for the block by modifying the confidence value based on perceptual importance of visual contents of the block; and compressing the image based on the perceptual importance metric.

11. The system of claim 10, wherein the modifying includes:

restricting the cost metrics used for determining the confidence value to an area of the image that is smaller than an area from which cost metrics are used for determining a motion vector for the block of pixels.

12. The system of claim 10, wherein the modifying includes:

modifying the confidence value based on a magnitude of a motion vector determined for the block of pixels of the image.

13. The system of claim 10, wherein the modifying includes:

applying one or more of either or both of spatial or temporal filters to the confidence value and confidence values of either or both of neighboring blocks of pixels of the image or blocks of pixels of either or both of future and past frames.

14. The system of claim 10, wherein the modifying includes:

applying one or more of linear or non-linear transformations to the confidence value.

15. The system of claim 10, wherein the image processor is configured to determine the cost metrics by:

for each of the candidate motion vectors, determining a cost metric based on similarity between the block of pixels of the image and a block of pixels pointed to by a candidate motion vector of the candidate motion vectors.

16. The system of claim 10, wherein the image processor is further configured to:

modify a number of bits to use for compressing the block based on the perceptual importance metric.

17. The system of claim 10, wherein the image processor is further configured to:

perform one of determining an area of interest of the image or adjusting an aspect of three-dimensional rendering of a subsequent frame based on the perceptual importance metric.

18. The system of claim 10, wherein the determining of the confidence value is based on a distribution of the determined cost metrics.

19. A non-transitory computer-readable medium storing instructions that, when executed by a processor, cause the processor to obtain a perceptual importance map for an image by:

determining cost metrics for a set of candidate motion vectors for a block of pixels of the image;

perform motion prediction for the block based on one candidate motion vector of the set of candidate motion vectors, wherein the one candidate motion vector is selected based on the cost metrics;

determining a confidence value for the block based on the cost metrics for the candidate motion vectors, based on a comparison of a first cost metric of the cost metrics to a second cost metric of the cost metrics;

obtaining a perceptual importance metric for the block by modifying the confidence value based on perceptual importance of visual contents of the block; and compressing the image based on the perceptual importance metric.

20. The non-transitory computer-readable medium of claim 19, wherein the instructions further cause the processor to:

modify a number of bits to use for compressing the block based on the perceptual importance metric.

21. The non-transitory computer-readable medium of claim 19, wherein the determining of the confidence value is based on a distribution of the determined cost metrics.

22. The non-transitory computer-readable medium of claim 19, wherein the modifying includes:

restricting the cost metrics used for determining the confidence value to an area of the image that is smaller than an area from which cost metrics are used for determining a motion vector for the block of pixels.

23. The non-transitory computer-readable medium of claim 19, wherein the modifying includes:

modifying the confidence value based on a magnitude of a motion vector determined for the block of pixels of the image.

* * * * *